Patented July 7, 1925.

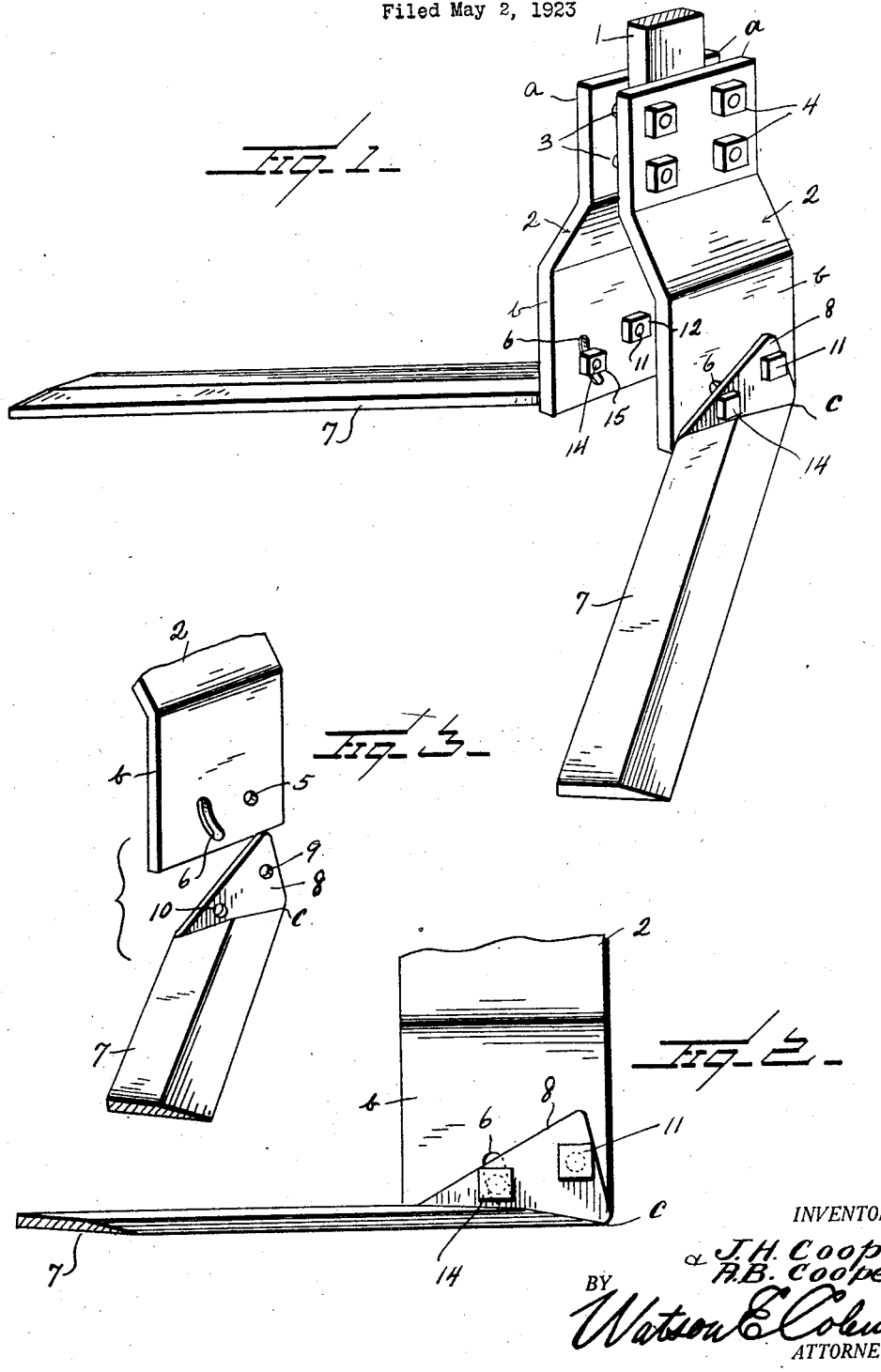

1,544,559

UNITED STATES PATENT OFFICE.

JAMES H. COOPER AND ROBERT B. COOPER, OF COLORADO, TEXAS.

WEED-CUTTING ATTACHMENT.

Application filed May 2, 1923. Serial No. 636,108.

*To all whom it may concern:*

Be it known that we, JAMES H. COOPER and ROBERT B. COOPER, citizens of the United States, residing at Colorado, in the county of Mitchell and State of Texas, have invented certain new and useful Improvements in Weed-Cutting Attachments, of which the following is a specification, reference being had to the accompanying drawings.

This invention relates to certain improvements in weed cutting attachments and which may be applied to a standard of a planter, plow or other agricultural implement and it is an object of the invention to provide a novel and improved attachment of this general character embodying a cutting blade mounted in a manner whereby the same can be readily and conveniently adjusted as required whereby the forward point of the knife is maintained in substantially the same position at all adjustments of the knife.

The invention consists in the details of construction and in the combination and arrangement of the several parts of our improved weed cutting attachment whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in perspective illustrating a weed cutting attachment constructed in accordance with an embodiment of our invention and in applied position, the coacting standard being illustrated in fragment;

Figure 2 is a fragmentary view partly in section and partly in elevation of the attachment as herein disclosed; and Figure 3 is a fragmentary view in perspective of one of the plates or hoods and the knife associated therewith, the same being in separated relation.

As disclosed in the accompanying drawings, 1 denotes a depending standard of an agricultural implement such as a planter, plow or the like and with which our improved attachment is adapted to be engaged.

Our improved attachment as herein shown comprises the two hoods or plates 2 having their upper portions inwardly offset, said portions *a* having close contact with the opposite faces of the standard 1 and effectively clamped thereto by the coacting bolts and nuts 3 and 4 disposed through said upper portions *a* fore and aft of the standard 1. The lower or outer portion *b* of each of the plates or hoods 2 is provided adjacent its forward end with an opening 5 and at a point rearwardly thereof with a vertically disposed arcuate slot 6, said slot 6 being arranged on an arc substantially concentric to the opening 5. Associated with each of the hoods or plates 2 is a knife 7 provided at its forward end with an upstanding and angularly extending attaching flange or shank 8. The flange or shank 8 is provided with the openings 9 and 10 registering respectively with the opening 5 and the slot 6 in the adjacent hood or plate 1. Disposed through the registering openings 5 and 9 is a bolt 11 having engaged therewith a nut 12, said bolt 11 serving as a pivot to permit upward swinging movement of the blade 7 to effect the desired adjustment thereof.

Disposed through the opening 10 and the slot 6 is a bolt 14 with which is engaged the nut 15, said bolt 14 and nut 15 providing means whereby the blade 7 may be effectively held in its different adjustments.

The forward marginal portion of the blade 7 is formed into a knife edge and by having the slot 6 concentric to the opening 5, the forward point *c* of the blade 7 is maintained in substantially the same position irrespective of the blade 7, said position being at the lower forward corner of the hood or plate 2. This is of particular advantage in view of the fact that weeds and trash are prevented from hanging or choking the device whereby the efficiency of the attachment is materially increased.

It also has been fully demonstrated in practice that by having the holes 9 and 10 in the flange or shank 8 instead of providing said flange or shank with the slots, the strength of the knife is materially increased.

From the foregoing description it is thought to be obvious that a weed cutting attachment constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

In combination with the depending standard of an agricultural implement, a pair of plates arranged at opposite sides thereof and extending therebelow, bolts disposed through the upper portions of the plates fore and aft of the standard, nuts threaded on said bolts and coacting with one of the plates whereby the plates are clamped to the standard, the end portions of the plates below the standard being outwardly offset, the lower portion of each of said plates being provided with an opening and with a vertically curved slot rearwardly of said opening, said slot being on an arc substantially concentric to the opening, a cutting blade provided with an upstanding angularly disposed flange, said flange having a pair of spaced openings, one of said openings registering with the opening in the plate and the second of said openings registering with the slot in the plate, a pivot member disposed through the registering openings, a bolt disposed through the second opening of the flange and the slot of the plate, and a nut engageable with the bolt, said bolt and nut serving to hold the knife against movement about the pivot, the forward point of the knife being positioned at substantially the lower forward corner of the plate.

In testimony whereof we hereunto affix our signatures.

JAMES H. COOPER.
ROBERT B. COOPER.